May 14, 1963 F. A. SATTLER ETAL 3,089,787
ELECTRICAL INSULATING COATING COMPOSITION, METHOD, AND
COATED ARTICLE
Filed Dec. 7, 1959

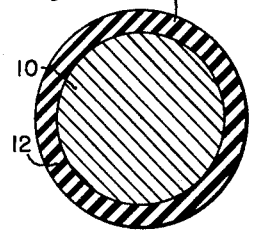

Insulation coating comprising (1) a polyester resin, (2) finely divided refractory material and (3) finely divided glass frit.

Fig. 1.

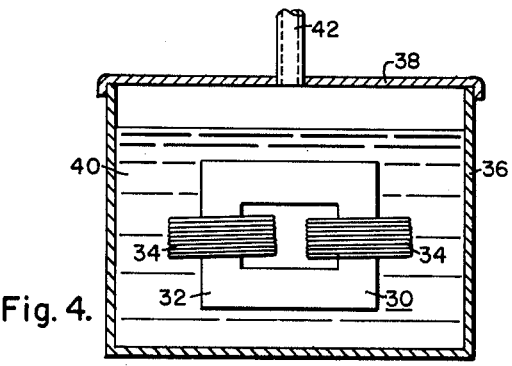

Fig. 4.

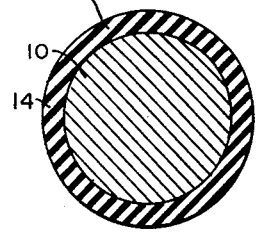

Inorganic insulation comprising, (1) refractory material and (2) fused glass frit.

Fig. 2.

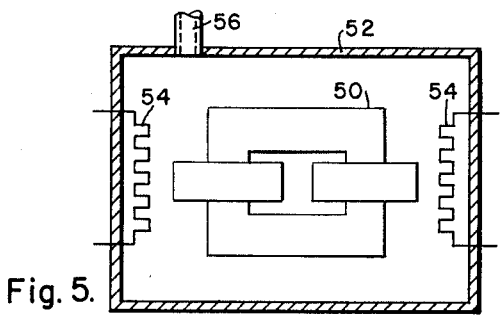

Fig. 5.

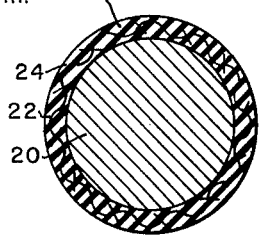

Inorganic fibrous insulation impregnated with a polyester resin.

Fig. 3.

WITNESSES:
Leon M. Garman
James F. Young

INVENTORS
Frank A. Sattler and
Paul A. Tierney
BY Charles J. Board
ATTORNEY

United States Patent Office 3,089,787
Patented May 14, 1963

3,089,787
ELECTRICAL INSULATING COATING COMPOSITION, METHOD, AND COATED ARTICLE
Frank A. Sattler and Paul A. Tierney, Monroeville, Pa., assignors to Westinghouse Electric Corporation, East Pittsburgh, Pa., a corporation of Pennsylvania
Filed Dec. 7, 1959, Ser. No. 857,894
14 Claims. (Cl. 117—215)

The present invention relates to inorganic insulation for electrical metallic conductors and to the method of applying same. The invention has particular reference to electrical metallic conductors provided with heat-hardened, solid, inorganic insulation adapted for use at temperatures of about 500° C. and higher. This invention relates also to electrical apparatus comprising electrical metallic conductors insulated with inorganic insulation, which electrical members are capable of satisfactory operation at temperatures of about 500° C. and higher.

Coatings on metallic conductors such as wires must be tough and hard to withstand the severe mechanical abuse to which windings comprising the coated metallic conductors are subjected in service. Also, coils frequently are wound from insulated wire under considerable pressure and at high speed. It is essential that the insulating coating applied to the wire be capable of withstanding the abrasion, bending stresses, and heavy pressures encountered during the winding without breaking, cracking or otherwise disrupting from the wire.

Organic enameling compositions are used widely in the electrical industry to provide insulation for metallic conductors such as wires. In general, such organic coatings are not capable of operating satisfactorily for long periods of time at temperatures substantially above 200° C. There is need in the electrical industry for a wire coating composition which, after application and when hardened on the wire, will operate satisfactorily for relatively long periods of time at temperatures of 500° C. and higher.

Attempts have been made in the past to apply inorganic type insulating coatings on metallic conductors such as wire and the like. These attempts have not been entirely satisfactory owing to the fact that the applied inorganic insulating material is brittle and fragile and is disrupted easily from the metallic conductor during winding operations and the like.

The present invention is directed to a method of applying inorganic insulating materials to metallic conductors and to metallic conductors comprising the applied inorganic insulation.

This invention is directed also to electrical apparatus comprising a metallic electrical conductor and inorganic insulation applied thereto.

This invention is directed further to an organic-inorganic coating composition and to electrical conductors coated therewith. The metallic conductor with the applied organic-inorganic coating composition is subsequently formed into its final desired configuration such, for example, as by winding the coated metallic conductor on a mandrel to provide a magnet coil for use in a transformer or like electrical apparatus. The organic component of the applied coating is then removed by the application of heat. The heat treatment removes the organic component of the applied coating leaving on the metallic conductor an insulating coating consisting substantially of inorganic materials.

For a complete understanding of the nature of this invention reference is made to the following detailed description taken in conjunction with the accompanying drawing, wherein:

FIGURE 1 is a cross-sectional view of a metallic conductor coated with organic and inorganic materials;
FIG. 2 is a cross-sectional view of a metallic conductor insulated with inorganic material;
FIG. 3 is a cross-sectional view of a metallic conductor coated with fibrous inorganic material impregnated with an organic resinous material;
FIG. 4 is a front view in cross-section of a transformer in an impregnating tank; and
FIG. 5 is a front view in cross-section of a transformer in a baking oven, the transformer being insulated in accordance with this invention.

In accordance with the present invention a metallic electrical conductor is provided with a tough, flexible, abrasion resistant coating comprising an organic resin component and inorganic insulating material. The metallic conductor with the applied coating is then formed into its final desired configuration such, for example, as by wrapping the wire with applied coating around a mandrel to form a coil for use in electrical apparatus such as transformers, motors, control coils, and the like. The coated metallic conductor in its final desired configuration is then heated to a temperature at which the organic portion of the coating is decomposed or volatilized and is substantially all removed from the applied coating. The coated metallic conductor is subjected to additional heat treatment whereby the metallic conductor is provided with a highly satisfactory adherent inorganic insulating coating. The additional heat treatment will be detailed more fully hereinafter.

Further, and in accordance with this invention, it has been determined that a wound metallic conductor with applied organic-inorganic coating can be potted in a ceramic potting composition to provide still more satisfactory inorganic insulation. The potted metallic conductor with applied organic-inorganic coating is then subjected to a heat treatment to remove substantially all the organic portion of the applied organic-inorganic coating. Further heat treatment is applied to improve the physical and electrical properties of the applied inorganic coating material and the ceramic potting composition.

For the purposes of this invention a specific organic-inorganic coating composition has been developed for application to the metallic conductor, which organic-inorganic coating composition can be easily and readily applied to the metallic conductor by conventional wire coating means such as in conventional wire enameling towers.

ORGANIC-INORGANIC COATING COMPOSITION

The organic-inorganic coating composition comprises certain inorganic insulating materials in finely divided form suspended in a solution of an organic resin. The inorganic insulating materials employed in admixture with the organic resin component comprises a certain specific glass in finely divided form and an insulating refractory material.

ORGANIC RESIN COMPONENT

The organic resin component employed in the organic-inorganic coating composition includes those polymeric resins which, in admixture with the inorganic portion of the coating composition, will form a tough, flexible, abrasion resistant coating on the metallic conductor. Further, the resinous material must, upon heating to its decomposition temperature, be clean-burning. That is, the organic material, upon heating to its decomposition temperature must be substantially all removed by volatilization from the applied coating, and must not leave any traces of carbon residue on the resulting inorganic insulating coating. It will be apparent that any carbon residue on the insulating coating is undesirable since carbon is an electrically conducting material.

It is to be understood that any organic resin meeting the above requirements can be employed satisfactorily in carrying out this invention without departing from the scope thereof. It has been determined that certain polyester resins meet the above requirements and these have been employed satisfactorily in carrying out this invention. The polyester resins employed decompose and are substantially completely removed from the applied coating at temperatures of from about 425° C. to 460° C.

The polyester resins employed in this invention are prepared by reacting (A) one mol of a dicarboxylic acid component with (B) from about 1.2 mols to 1.5 mols of a mixture of polyhydric alcohols comprised of from (1) about 0.95 to 0.50 mol-fraction of at least one dihydric saturated aliphatic alcohol and (2) from about 0.05 to 0.50 mol-fraction of at least one polyhydric saturated aliphatic alcohol having at least three reactive hydroxy groups per molecule. The reaction is preferably carried out in the presence of from 0.005 percent to 2 percent by weight, based on the total weight of the reactants, of an esterification catalyst. Suitable esterification catalysts are well known in the art and include metal salts of organic acids, metal oxides, and metal chelates.

The dicarboxylic acid component (A) employed in the preparation of the polyester can be isophthalic acid, dialkyl esters of isophthalic acid, dialkyl esters of terephthalic acid, and mixtures of two or more.

The dialkyl esters of terephthalic acid that can be employed in carrying out this invention include those esters in which the alkyl groups contain from 1 to 4 carbon atoms, for example, methyl, ethyl, propyl, isopropyl, butyl, isobutyl, and t-butyl. Dimethyl terephthalate and diethyl terephthalate are specific examples of dialkyl esters of terephthalic acid.

The dialkyl esters of isophthalic acid that can be employed in carrying out this invention include those esters in which the alkyl groups contain from 1 to 4 carbon atoms, for example, methyl, ethyl, propyl, isopropyl, butyl, isobutyl, and t-butyl. Dimethyl isophthalate, diethyl isophthalate, and diisopropyl isophthalate are specific examples of dialkyl esters of isophthalic acid.

Dihydric saturated alcohols (1) that comprise a portion of the mixture of polyhydric alcohols (B) which are suitable for preparing the polyesters for use in this invention comprise dihydric saturated aliphatic alcohols having from 2 to 8 carbon atoms per molecule. Examples of such alcohols include 1,2-ethanediol; 1,2-propanediol; 1,3-propanediol; 1,2-butanediol; 1,3-butanediol; 2,3-butanediol; 2-methylpropane-1,2-diol; 1,4-butanediol; and 1,6-hexanediol.

Examples of polyhydric saturated aliphatic alcohols (2) having at least three reactive hydroxy groups which comprise the other portion of the mixture of polyhydric alcohols (B) include glycerol; 1,1,1-trimethylolpropane; 1,1,1-trimethylolethane; 1,2,3-butanetriol; erythritol; and pentaerythritol.

Highly satisfactory materials for use as the esterification catalyst in preparing the polyester include salts of organic acids selected from the group consisting of saturated and unsaturated aliphatic acids, cyclic acids, and aromatic acids. Examples of such catalysts include linolates, resinates, naphthenates, acetates, aromatic benzoates, octoates, tall oil acids, and stearates of metals including aluminum, calcium, cesium, chromium, cobalt, copper, lead, manganese, nickel, tin, titanium, vanadium, zinc, and zirconium. Two or more metal salts can be employed jointly as the catalyst. Other suitable catalysts, such for example as metal acetyl acetonates can be employed. Titanium acetyl acetonate is a specific example of such a catalyst. Other suitable catalysts include lead oxide, the oxides and carbonates of the alkali and alkaline earth metals including sodium carbonate, calcium oxide, and magnesium oxide.

The resinous polyesters employed in this invention can be prepared in accordance with usual esterification procedures as, for example, by heating a mixture of the acidic components, polyhydric alcohols and catalyst at a temperature of from about 150° C. to 250° C. In many cases, more complete esterification is obtained when the relatively low boiling point alcohol formed during the esterification reaction is removed by carrying out the esterification in the presence of an organic liquid such as m,p-cresol or the like, and by passing a sparging gas such as nitrogen or carbon dioxide through the reaction mixture.

For the purposes of this invention the polyester is utilized in solution form. Thus the polyester is dissolved in a suitable solvent. A suitable solvent is one comprising a mixture of cresols and hydrocarbons having a boiling point range of from about 135° C. to 250° C. together with certain monohydric alcohols. More specifically, mixtures of solvents comprising from 40% to 50% by weight of a phenol such as cresol or xylenol, or mixtures thereof, such as a mixture of phenol and cresol in equal parts can be combined with one or more of the following: ethanol, isopropanol, propanol, monochlorobenzene, xylol, toluol, and petroleum hydrocarbon distillates having boiling points within the range of from about 130° C. to 200° C. Ordinarily, the polyester solution employed will comprise from about 10 to 40 parts by weight of the polyester resin and from about 90 to 60 parts by weight of solvent.

In order to illustrate the polyester employed in this invention, the following specific examples are set forth:

*Example I*

Into a reaction vessel equipped with external heating means, stirrer, thermometer and nitrogen sparging tube with attached air condenser there are placed the following ingredients: 3400 grams of dimethylterephthalate, 3400 grams of dimethylisophthalate, 1355 grams of ethylene glycol, 2365 grams of 1,4-butanediol, 268 grams of glycerol, and 87.4 grams of titanium acetyl acetonate.

These ingredients are heated relatively fast with stirring and nitrogen gas sparging until the temperature of the reaction mass reaches about 160° C. Thereafter, the temperature of the reaction mass is increased slowly at a rate of about 20° C. per hour until the temperature of the reaction mass reaches 275° C. This temperature of 275° C. is maintained for about one hour and a viscous, thread-forming resin is obtained. The resin is then dissolved in 8750 milliliters of cresol and 5250 milliliters of xylene. The resulting resin varnish solution has a resin solids content of about 40%.

*Example II*

Into a reaction vessel fitted with the same attachments as in Example I there are placed the following ingredients: 970 grams of dimethylterephthalate, 831 grams of isophthalic acid, 945 grams of 1,4-butanediol, 282 grams of glycerol, and 25 grams of titanium acetyl acetonate.

These ingredients are heated rather rapidly with stirring and nitrogen gas sparging to a temperature of about 160° C., and thereafter, the temperature of the reaction mass is increased about 20° C. per hour until the temperature of the reaction mass reaches about 260° C. The reaction mass is maintained at this temperature of 260° C. for about 1 hour and the resin thus produced is viscous and forms threads easily. The resin is then dissolved into 2500 milliliters of cresol and 3500 milliliters xylene. The resulting resin varnish composition has a resin solids content of about 35%.

INORGANIC MATERIALS

As previously set forth the inorganic portions of the organic-inorganic coating composition consist of a refractory insulating material and a specific glass composition. Both the refractory material and the glass composition are preferably employed in finely divided form and particularly of the order of from 100 mesh to 500 mesh.

The refractory materials suitable for the preparation of the organic-inorganic coating material comprise the oxides and silicates of metals selected from the group consisting of calcium, barium, magnesium, titanium, cadmium, aluminum, zinc, lead, chromium and zirconium. Examples of such materials include alumina ($Al_2O_3$), silica ($SiO_2$), calcined clay, mica, zirconium silicate ($ZrSiO_4$), titania ($TiO_2$), zirconia ($ZrO_2$), chromium III oxide ($Cr_2O_3$), barium oxide (BaO), calcium oxide (CaO), magnesium oxide (MgO), and mixtures of two or more.

The glass composition employed in preparing the organic-inorganic coating composition for use in this invention falls within the following ranges of percentage composition by weight, viz: between 20% and 35% PbO, between 20% and 30% BaO, between 10% and 20% $B_2O_3$, between 5% and 20% $SiO_2$, between 4% and 10% CaO, and between 1% and 10% $Al_2O_3$. Any remaining ingredients in the glass composition will be in the form of impurities and will be restricted to below about 2%.

Preferred glass compositions for use in this invention fall within the following ranges of percentage composition by weight, viz: between 22% and 32% PbO, between 25% and 30% BaO, between 12% and 20% $B_2O_3$, between 8% and 19% $SiO_2$, between 5% and 8% CaO, and between 4% and 9% $Al_2O_3$.

The above glass compositions have sag points in excess of 500° C. hence will not soften and flow at operating temperatures of 500° C. and higher. However, upon heating to a temperature of about 700° C. the glass will readily fuse and coalesce.

To prepare finely divided particles of the above glass composition, ingredients in amounts necessary to provide the desired glass composition are placed in a suitable vessel, dry mixed and then heated to a temperature of from about 1000° C. to about 1100° C. at which temperature the ingredients fuse and form a homogenous molten glass mass. The molten mass of glass is then poured into water and the glass is shattered (the resulting product being known as "frit"). This frit is ball-milled either wet or dry to the desired particle size.

Glasses of the above compositions and their properties are disclosed in application Serial No. 847,911, filed October 22, 1959, and now U.S. Patent No. 2,972,544. Reference is hereby made to the above application Serial No. 847,911, for a more complete description of the above glass compositions and their properties.

The organic-inorganic coating composition for use in this invention will comprise, by weight, from 40% to 60% of the organic resin component, from 20% to 40% of the refractory material, and from 10% to 30% of the specific glass composition. This coating composition is applied to the metallic conductor in the form of a liquid suspension. Thus, the desired amount of resin component and in particular the polyester resin above described is first dissolved in a suitable solvent therefor (preferred solvents are set forth hereinabove) and to this solution there are added the desired amounts of refractory material and glass in finely divided form. The resulting mixture is then ball-milled for a period of time of from about 12 hours to 48 hours. The resulting mixture or liquid suspension can be easily and readily applied to metallic wire conductors in conventional wire coating apparatus.

After the organic-inorganic coating has been applied to the wire, the coated wire is subjected to a heat treatment to remove the organic portion thereof. This is accomplished by heating gradually the coated wire in an oven at least to the decomposition temperatures of the resin component and maintaining this temperature until substantially all the polyester component is removed. The time required is usually about ½ hour to 2 hours. Air flow through the oven is recommended to remove the volatile constituents therefrom during this heating period. Thereafter the temperature of the oven is increased to the fusion temperature of the glass which comprises the inorganic portion of the applied coating. This fusion temperature is about 700° C. for the glass employed in this invention. No air flow through the oven is required during this heating period. Usually a period of time of from about ½ hour to 2 hours is adequate to properly fuse the glass which fused glass bonds the refractory material in place on the wire. The wire with the applied inorganic insulation is then cooled slowly to room temperature.

The following example is illustrative of the preparation of the organic-inorganic coating composition for use in this invention.

*Example III*

One thousand two hundred and fifty (1250) parts by weight, of the resin solution of Example I are admixed with 300 parts by weight of 200 mesh silica ($SiO_2$) and 200 parts by weight of a glass composition comprising, by weight, 30.9% of PbO, 15.5% of $B_2O_3$, 7.2% of $Al_2O_3$, 25.8% of BaO, 15.5% of $SiO_2$, and 5.1% of CaO. This mixture is ball-milled for 48 hours. The resulting mixture or liquid suspension is further diluted with 2100 parts by weight of xylene and 700 parts by weight of cresol to provide a liquid suspension for application to a wire conductor.

A number 22 A.W.G. silver wire is passed through the liquid suspension and then passed through a vertical baking tower maintained at a temperature of about 430° C. at a rate of 28 feet per minute. The organic solvent is removed from the applied coating by evaporation in the baking tower. The resulting coating has a thickness of 1.9 mils and is smooth, hard, and adherent. The coating has sufficient flexibility to remain crack-free when the wire is elongated rapidly to the breaking point.

Referring to FIG. 1 of the drawing there is shown conductor 10 in the form of a wire of circular cross-section with the organic-inorganic coating composition 12 of this invention applied thereto.

The coated wire is employed to prepare standard NEMA twisted pairs for testing purposes. Twisted pairs are heat treated according to the following procedure: one-half hour at 350° C. with air flowing through the furnace to remove volatile constituents, one-half hour at 450° C. with air flow to remove volatile constituents, one-quarter hour at 550° C. without air flow, one-quarter hour at 650° C. without air flow, and one-quarter hour at 700° C. without air flow. A smooth, adherent inorganic or ceramic insulating film remained on the wire and the wire-to-wire break down at 25° C. of this insulating coating is 450 to 600 volts. Four of the treated twisted wire pairs are placed in a furnace and 200 volts applied to them. The temperature of the furnace is increased until break down occurs. The break down temperature at 200 volts is 865° C. to 910° C. for the four samples.

Referring to FIG. 2 of the drawing there is illustrated conductor 10 after the organic portion of the organic-inorganic coating 12 has been removed therefrom by heating to the decomposition temperature of the applied organic portion of the coating material and after heating to the fusion temperature of the glass. The insulated conductor as shown in FIG. 2 of the drawing comprises metallic conductor 10 and inorganic insulation 14 which comprises the refractory material adherently bonded together and bonded to the conductor 10 by the fusion of the glass portion of the applied inorganic insulation.

Further, in accordance with this invention, it has been determined that the polyester resin above described can be employed in association with other inorganic materials to provide a coated electrical conductor which can be wound easily and readily into desired configuration such, for example, as a coil. The resin is subsequently removed therefrom by heating to the decomposition temperature of the polyester resin leaving the inorganic portion thereof intact on the electrical conductor.

Thus, for example, glass served wire is highly satisfactory for use in high temperature applications where poor space factor can be tolerated. However, as is well known in the art, it is extremely difficult to wind glass served wire and maintain the glass in proper position on the wire. Thus, the glass will break or abrade or otherwise be removed from the wire during the winding process. By coating the glass served wire in a suitable wire coating apparatus with the polyester resin of this invention, a highly satisfactory adherent, tough, abrasion resistant coating is applied.

Thus, the glass served wire with the applied polyester resin can be easily and readily wrapped about a magnet, for example, and the organic polyester resin removed as hereinbefore described by heating to the decomposition temperature of the polyester resin.

Referring to FIG. 3 of the drawing there is shown this modification of the invention. Metallic conductor 20 is provided with a wrapping of glass serving 22 and there is subsequently applied to the glass served wire polyester resin 24.

As hereinbefore set forth it is preferred to form the metallic conductor coated with the organic-inorganic coating composition in its final and desired configuration and to then pot the coated metallic member in a ceramic potting composition prior to the application of the heat treatment to remove from the coating composition the organic portion thereof. A potting composition consisting essentially of a low melting point lead borate glass and a cement-type composition has been found highly satisfactory as a ceramic potting composition for use in this invention.

CERAMIC POTTING COMPOSITION

The ceramic potting composition employed in this invention must be compatible with the other insulating materials with which it makes contact and further must maintain its high strength properties at the high temperatures to which it is subjected during service.

A highly satisfactory ceramic potting composition for use in this invention is one comprising a mixture of (i) from 70% to 80% by weight of a specific cement material (to be detailed hereinafter) in finely divided form and (ii) from 30% to 20% by weight of a low melting point lead-borate glass in finely divided form.

The cement component (i) of the potting composition comprises, by weight, from 30% to 35% of alumina ($Al_2O_3$), from 35% to 40% of magnesium oxide (MgO), from 12% to 17% of silica ($SiO_2$), and from 10% to 15% of ammonium dihydrogen phosphate ($NH_4H_2PO_4$).

The cement preferably is prepared by heating a mixture of the desired amount of alumina, magnesium oxide, and silica to a temperature of about 1600° C. to provide a clinker. The resulting clinker is then placed in a ball mill with the desired amount of ammonium dihydrogen phosphate and ball-milled to provide a finely divided intimate admixture of the desired composition.

The lead-borate glass component (ii) of the ceramic potting composition consists essentially of, by weight, from about 10% to 20% of boron oxide ($B_2O_3$) and from about 90% to 80% of lead oxide (PbO).

The lead-borate glass is prepared by heating in a suitable vessel to fusion the desired amount of boron oxide and lead oxide. Fusion temperature is from about 500° C. to 600° C. The resulting glass composition, after cooling to room temperature, is then pulverized into finely divided particles in a ball-mill.

The ceramic potting composition is employed in the form of a slurry. A water-alcohol mixture comprising, by weight, from about 40 to 60 parts of distilled water and from about 60 to 40 parts of ethanol in an amount of from about 10% to 15% by weight, based on the total weight of the potting composition, is admixed with the potting composition, to provide a usable slurry. More or less water-alcohol mixture can be added to vary the consistency of the slurry as desired. Excessive amounts of water-alcohol mixture, however, will render the resulting casting of the potting composition weak and porous and should be avoided. Water alone can be employed to provide a slurry; however, it is preferred to employ the water-alcohol mixture as the set time of the slurry is substantially increased.

The following example is illustrative of a potting composition for use in carrying out this invention.

Example IV

A cement component in finely divided form consisting of, by weight, 35% of alumina, 35% of magnesium oxide, 15% of silica and 15% of ammonium dihydrogen phosphate is prepared as hereinabove described. Seventeen hundred and fifty parts by weight, of the cement is thoroughly admixed with 250 parts by weight, of lead-borate glass consisting of 15% by weight, of boron oxide and 85% of lead oxide. Three hundred and forty parts by weight, of a mixture of 11 parts by weight, of distilled water and 7 parts by weight, of ethanol are admixed with the powdered mixture to produce a slurry of desired consistency.

The invention now will be described with particular reference to the insulating of an electrical transformer employing the above described ceramic potting composition. Referring to FIG. 4 of the drawing there is shown a transformer 30 having a magnetic core 32 and coils 34 positioned within a tank 36. The coils 34 are formed by wrapping around the magnetic core 32 the desired number of turns of electrical wire conductor coated with the organic-inorganic coating composition of this invention as shown in FIG. 1 of the drawing. The tank 36 can be automatically sealed by a cover 38. The tank is filled with a slurry 40 of the hereinbefore described ceramic potting composition, and then is evacuated of air through line 42. The slurry 40 is vacuum impregnated into the interstices within the transformer 30. The vacuum is then released and the coated transformer is removed from tank 36 and allowed to air dry for a period of about 16 hours. Thereafter the coated transformer 50 is placed in a baking oven 52 having heating elements 54 as shown in FIG. 5 of the drawing. The temperature in the oven is increased gradually from room temperature to about 450° C. over a period of about 6 to 10 hours. The potted transformer 50 is left in the oven for about one and one-half hours at this temperature of 450° C., during which time the polyester resin component of the organic-inorganic coating composition decomposes or is burned out. During this period air is flowed through the oven 52 and the volatile constituents are removed through stack 56. The temperature of the oven is then increased to a temperature of about 700° C. over a period of about one hour and the potted transformer 50 is left in the oven for about 30 minutes at this temperature during which time the glass portion of the inorganic wire insulation fuses and the potting composition is cured.

The potted transformer is capable of operating continuously at temperatures of about 500° C. and higher. The potting composition, thoroughly impregnating the interstices within the transformer has high insulating properties and physical properties and further prevents any wire-to-wire cut through during the processing steps hereinabove described and during service.

It is to be understood that the above description and drawings are illustrative of the invention and not in limitation thereof.

We claim as our invention:

1. A liquid suspension coating composition comprising, by weight, (I) from 40% to 60% of a polyester resin component derived by reacting (A) one mol of a dicarboxylic acid component selected from at least one of the group consisting of isophthalic acid, dialkyl esters of isophthalic acid, and dialkyl esters of terephthalic acid and (B) from about 1.2 mols to 1.5 mols of a mixture of polyhydric alcohols consisting essentially of (1) about .95 to .50 mol-fraction of at least one dihydric saturated aliphatic alcohol having from 2 to 8 carbon atoms and (2) about .05 to .50 mol-fraction of at least one polyhydric saturated aliphatic alcohol having at least three reactive hydroxy groups per molecule, and (C) from 0.005% to 2% by weight, based on the total weight of the reactants, of an esterification catalyst, (II) from 20% to 40% of a finely divided refractory material selected from at least one of the group consisting of silica, and the oxides and silicates of metals selected from the group consisting of calcium, barium, magnesium, titanium, cadmium, aluminum, zinc, lead, chromium and zirconium, (III) from 10% to 30% of a finely divided glass composition consisting essentially of, by weight, from 20% to 35% PbO, from 10% to 20% $B_2O_3$, from 20% to 30% of BaO, from 5% to 20% $SiO_2$, from 4% to 10% CaO, and 1% to 10% $Al_2O_3$, and (IV) a solvent for polyester resin (I).

2. A liquid suspension coating composition comprising, by weight, (I) from 40% to 60% of a polyester resin component derived by reacting (A) one mol of a dicarboxylic acid component selected from at least one of the group consisting of isophthalic acid, dialkyl esters of isophthalic acid, and dialkyl esters of terephthalic acid and (B) from 1.2 mols to 1.5 mols of a mixture of polyhydric alcohols consisting essentially of (1) about .95 to .50 mol-fraction of at least one dihydric saturated aliphatic alcohol having from 2 to 8 carbon atoms and (2) about .05 to .50 mol-fraction of at least one polyhydric saturated aliphatic alcohol having at least three reactive hydroxy groups per molecule, and (C) from 0.005 to 2% by weight, based on the total weight of the reactants of an esterification catalyst, (II) from 20% to 40% of a finely divided refractory material selected from at least one of the groups consisting of silica, and the oxides and silicates of metals selected from the group consisting of calcium, barium, magnesium, titanium, cadmium, aluminum, zinc, lead, chromium, and zirconium, (III) from 10% to 30% of a finely divided glass composition consisting essentially of, by weight, from 22% to 32% of PbO, from 25% to 30% BaO, from 12% to 20% $P_2O_3$, from 8% to 19% $SiO_2$, from 5% to 8% CaO, and from 4% to 9% $Al_2O_3$, and (IV) a solvent mixture for polyester (I) comprising a mixture of cresols and hydrocarbons having a boiling point range of from about 135° C. to 250° C.

3. A coated electrical conductor comprising, in combination, a metallic conductor and an organic-inorganic coating applied thereto, said organic-inorganic coating comprising (I) a polyester resin component derived by reacting (A) one mol of a dicarboxylic acid component selected from at least one of the group consisting of isophthalic acid, dialkyl esters of isophthalic acid, and dialkyl esters of terephthalic acid and (B) from about 1.2 mols to 1.5 mols of a mixture of polyhydric alcohols consisting essentially of (1) about .95 to .50 mol-fraction of at least one dihydric saturated aliphatic alcohol having from 2 to 8 carbon atoms and (2) about .05 to .50 mol-fraction of at least one polyhydric saturated aliphatic alcohol having at least three reactive hydroxy groups per molecule, and (C) from 0.005% to 2% by weight, based on the total weight of the reactants, of an esterification catalyst, and (II) an inorganic electrically insulating material.

4. A coated electrical conductor comprising, in combination, a metallic conductor and an organic-inorganic coating composition applied thereto, said coating composition comprising, by weight, (I) from 40% to 60% of a polyester resin component derived by reacting (A) one mol of a dicarboxylic acid component selected from at least one of the group consisting of isophthalic acid, dialkyl esters of isophthalic acid, and dialkyl esters of terephthalic acid and (B) from about 1.2 mols to 1.5 mols of a mixture of polyhydric alcohols consisting essentially of (1) about .95 to .50 mol-fraction of at least one dihydric saturated aliphatic alcohol having from 2 to 8 carbon atoms and (2) about .05 to .50 mol-fraction of at least one polyhydric saturated aliphatic alcohol having at least three reactive hydroxy groups per molecule, and (C) from 0.005% to 2% by weight, based on the total weight of the reactants, of an esterification catalyst, (II) from 20% to 40% of a finely divided refractory material selected from at least one of the group consisting of silica, and the oxides and silicates of metals selected from the group consisting of calcium, barium, magnesium, titanium, cadmium, aluminum, zinc, lead, chromium and zirconium, (III) from 10% to 30% of a finely divided glass composition consisting essentially of, by weight, from 20% to 35% PbO, from 10% to 20% $B_2O_3$, from 20% to 30% of BaO, from 5% to 20% $SiO_2$, from 4% to 10% CaO, and 1% to 10% $Al_2O_3$.

5. A coated electrical conductor comprising, in combination, a metallic conductor, a layer of inorganic fibrous material applied to the conductor, and a coating applied to impregnate at least a part of the inorganic fibrous material, said coating comprising a polyester resin component derived by reacting (A) one mol of a dicarboxylic acid component selected from at least one of the group consisting of isophthalic acid, dialkyl esters of isophthalic acid, and dialkyl esters of terephthalic acid and (B) from about 1.2 mols to 1.5 mols of a mixture of polyhydric alcohols consisting essentially of (1) about .95 to .50 mol-fraction of at least one dihydric saturated aliphatic alcohol having from 2 to 8 carbon atoms and (2) about .05 to .50 mol-fraction of at least one polyhydric saturated aliphatic alcohol having at least three reactive hydroxy groups per molecule, and (C) from 0.005% to 2% by weight, based on the total weight of the reactants, of an esterification catalyst.

6. An insulated electrical conductor comprising, in combination, a metallic conductor, and an insulating coating applied to the metallic conductor, said insulating coating having been derived by applying to the conductor a coating comprising, by weight, (I) from 40% to 60% of a polyester resin component derived by reacting (A) one mol of a dicarboxylic acid component selected from at least one of the group consisting of isophthalic acid, dialkyl esters of isophthalic acid, and dialkyl esters of terephthalic acid, and (B) from about 1.2 mols to 1.5 mols of a mixture of polyhydric alcohols consisting essentially of (I) about .95 to .50 mol-fraction of at least one dihydric saturated aliphatic alcohol having from 2 to 8 carbon atoms and (2) about .05 to .50 mol-fraction of at least one polyhydric saturated aliphatic alcohol having at least three reactive hydroxy groups per molecule, and (C) from 0.005% to 2% by weight, based on the total weight of the reactants, of an esterification catalyst, (II) from 20% to 40% of a finely divided refractory material selected from at least one of the group consisting of silica, and the oxides and silicates of metals selected from the group consisting of calcium, barium, magnesium, titanium, cadmium, aluminum, zinc, lead, chromium, and zirconium, (III) from 10% to 30% of a finely divided glass composition consisting essentially of, by weight, from 20% to 35% PbO, from 10% to 20% $B_2O_3$, from 20% to 30% of BaO, from 5% to 20% $SiO_2$, from 4% to 10% CaO, and 1% to 10% $Al_2O_3$, a final coated conductor comprising the metal conductor containing a coating of fused glass having therein the said finely divided refractory material (II), and the said polyester resin (I) having been removed therefrom.

7. An insulated electrical member comprising an electrical conductor and inorganic insulation applied thereto, said inorganic insulation having been derived by applying to the conductor a coating comprising by weight, (I) from 40% to 60% of a polyester resin component derived by reacting (A) one mol of a dicarboxylic acid component selected from at least one of the group consisting of isophthalic acid, dialkyl esters of isophthalic acid, and dialkyl esters of terephthalic acid, and (B) from about 1.2 mols to 1.5 mols of a mixture of polyhydric alcohols consisting essentially of (1) about .95 to .50 mol-fraction of at least one dihydric saturated aliphatic alcohol having from 2 to 8 carbon atoms and (2) about .05 to .50 mol-fraction of at least one polyhydric saturated aliphatic alcohol having at least three reactive hydroxy groups per molecule, and (C) from 0.005% to 2% by weight, based on the total weight of the reactants, of an esterification catalyst, (II) from 20% to 40% of a finely divided refractory material selected from at least one of the group consisting of silica, and the oxides and silicates of metals selected from the group consisting of calcium, barium, magnesium, titanium, cadmium, aluminum, zinc, lead, chromium and zirconium, (III) from 10% to 30% of a finely divided glass composition consisting essentially of, by weight, from 20% to 35% PbO, from 10% to 20% $B_2O_3$, from 20% to 30% of BaO, from 5% to 20% $SiO_2$, from 4% to 10% CaO, and 1% to 10% $Al_2O_3$ and a ceramic potting composition consisting essentially of, by weight, from 70% to 80% of (i) an intimate admixture consisting essentially, by weight, from 30% to 35% of alumina, from 35% to 40% of magnesium oxide, from 12% to 17% silica, and from 10% to 15% of ammonium dihydrogen phosphate and (ii) from 30 to 20% a lead-borate glass component consisting essentially of, by weight, from about 10% to 20% of boron oxide and from 90% to 80% of lead oxide, the final coated conductor comprising the metallic conductor coated with a layer of fused glass containing the said finely divided refractory material (II), the said polyester resin (I) and having been driven off, and the coated conductor having thereover said potting composition in cured state.

8. A liquid suspension coating composition comprising, by weight, (I) from 40% to 60% of a polyester resin, (II) from 20% to 40% of a finely divided refractory material selected from at least one of the group consisting of silica, and the oxides and silicates of metals selected from the group consisting of calcium, barium, magnesium, titanium, cadmium, aluminum, zinc, lead, chromium, and zirconium, (III) from 10% to 30% of a finely divided glass composition consisting essentially of, by weight, from 20% to 35% PbO, from 10% to 20% $B_2O_3$, from 20% to 30% BaO, from 5% to 20% $SiO_2$, from 4% to 10% CaO, and from 1% to 5% $Al_2O_3$, and (IV) a solvent for polyester resin (I).

9. A method of producing an insulated electrical conductor which comprises applying to a metallic conductor a coating comprising, by weight, (I) from 40% to 60% of a polyester resin, (II) from 20% to 40% of a finely divided refractory material selected from at least one of the group consisting of silica, and the oxides and silicates of metals selected from the group consisting of calcium, barium, magnesium, titanium, cadmium, aluminum, zinc, lead, chromium, and zirconium, (III) from 10% to 30% of a finely divided glass composition consisting essentially of, by weight, from 20% to 35% PbO, from 10% to 20% $B_2O_3$, from 20% to 30% of BaO, from 5% to 20% $SiO_2$, from 4% to 10% CaO, and from 1% to 10% $Al_2O_3$, heating the coated conductor to a temperature of from about 452°C to about 460° C. until substantially all of the polyester resin (I) is removed from the coating, and fusing the glass (III) at a temperature of about 700° C. whereby the finely divided particles of refractory material (II) are bonded together and to the metallic conductor.

10. A method of producing an insulated electrical conductor which comprises applying to a metallic conductor a coating comprising, by weight, (I) from 40% to 60% of a polyester resin, (II) from 20% to 40% of a finely divided refractory material selected from at least one of the group consisting of silica, and the oxides and silicates of metals selected from the group consisting of calcium, barium, magnesium, titanium, cadmium, aluminum, zinc, lead, chromium, and zirconium, (III) from 10% to 30% of a finely divided glass composition consisting essentially of, by weight, from 20% to 35% PbO, from 10% to 20% $B_2O_3$, from 20% to 30% of BaO, from 5% to 20% $SiO_2$, from 4% to 10% CaO, and from 1% to 10% $Al_2O_3$, and potting the coated conductor in a water-alcohol slurry of a ceramic potting composition consisting essentially of, by weight, from 70% to 80% of (i) an intimate admixture consisting essentially, by weight, of from 30% to 35% of alumina, from 35% to 40% of magnesium oxide, from 12% to 17% silica, and from 10% to 15% of ammonium dihydrogen phosphate and (ii) from 30% to 20% of a lead-borate glass component consisting essentially of, by weight, from about 10% to 20% boron oxide and from 90% to 80% of lead oxide, air-drying the applied potting composition to remove substantially all the water and alcohol therefrom, heating the electrical conductor with applied coating and potting composition to a temperature of from about 425° C. to 460° C. until substantially all polyester resin (I) is removed from the applied coating, and heating the coated and potted conductor to a temperature of about 700° C. to fuse the glass composition (III) whereby the finely divided particles of refractory material (II) are bonded together and the ceramic potting composition is cured.

11. A method of producing potted electrical members having fibrous inorganic insulation disposed thereabout comprising the steps of impregnating the fibrous inorganic insulated member with a polyester resin, potting the coated insulated member in a water-alcohol slurry of a ceramic potting composition consisting essentially of, by weight, from 70% to 80% of (I) an intimate admixture consisting essentially, by weight, of from 30% to 35% of alumina, from 35% to 40% of magnesium oxide, from 12% to 17% silica, and from 10% to 15% of ammonium dihydrogen phosphate and (II) from 30% to 20% of a lead-borate glass component consisting essentially of, by weight, from about 10% to 20% of boron oxide and from 90% to 80% of lead oxide, drying the applied potting composition to remove substantially all the water and alcohol therefrom, and heating the potted member to cure the ceramic potting composition whereby substantially all of the polyester is removed and the ceramic potting composition is solidified.

12. An insulated electrical member comprising, in combination, an inorganic fibrous insulated electrical conductor and a ceramic potting composition applied thereto, said ceramic potting composition having been derived by impregnating the fibrous insulation with a polyester resin, the ceramic potting composition deposited thereto consisting essentially of, by weight, from 70% to 80% of (I) an intimate admixture consisting essentially of, by weight, from 30% to 35% of alumina, from 35% to 40% of magnesium oxide, from 12% to 17% silica, and from 10% to 15% of ammonium dihydrogen phosphate and (II) from 30% to 20% of a lead borate glass component consisting essentially of, by weight, from about 10% to 20% of boron oxide and from 90% to 80% of lead oxide, the final electrical member comprising the inorganic fibrous insulated electrical conductor and the solidified potting composition, said polyester resin having been driven off during the cure of the potting composition.

13. A method of producing an insulated electrical conductor which comprises applying to a metallic conductor a coating comprising, by weight, (i) from 40% to 60% of a polyester resin, (II) from 20% to 40% of a finely divided refractory material selected from at least one of the group consisting of silica, and the oxides and silicates of metals selected from the group consisting of calcium, barium, magnesium, titanium, cadmium, aluminum, zinc, lead, chromium and zirconium, (III) from 10% to 30% of a finely divided glass composition consisting essentially of, by weight, from 20% to 35% PbO, from 10% to 20% $B_2O_3$, from 20% to 30% of BaO, from 5% to 20% $SiO_2$, from 4% to 10% CaO and from 1% to 10% $Al_2O_3$, potting the coated conductor in a slurry of a ceramic potting composition, heating the electrical conductor with applied coating and potting composition until substantially all of the polyester resin (I) is removed from the applied coating, and heating the coated and potted conductor to a temperature of about 700° C. to fuse the glass composition (III) whereby the finely divided particles of refractory material (II) are bonded together and the ceramic potting composition is cured.

14. An insulated electrical member comprising an electrical conductor and inorganic insulation applied thereto, said inorganic insulation having been derived by applying to the conductor a coating comprising by weight, (I) from 40% to 60% of a polyester resin component derived by reacting (A) one mol of a dicarboxylic acid component selected from at least one of the group consisting of isophthalic acid, dialkyl esters of isophthalic acid, and dialkyl esters of terephthalic acid, and (B) from about 1.2 mols to 1.5 mols of a mixture of polyhydric alcohols consisting essentially of (1) about .95 to .50 mol-fraction of at least one dihydric saturated aliphatic alcohol having from 2 to 8 carbon atoms and (2) about .05 to .50 mol-fraction of at least one polyhydric saturated aliphatic alcohol having at least three reactive hydroxy groups per molecule, and (C) from 0.005% to 2% by weight, based on the total weight of the reactants, of an esterification catalyst, (II) from 20% to 40% of a finely divided refractory material selected from at least one of the group consisting of silica, and the oxides and silicates of metals selected from the group consisting of calcium, barium, magnesium, titanium, cadmium, aluminum, zinc, lead, chromium, and zirconium, (III) from 10% to 30% of a finely divided glass composition consisting essentially of, by weight, from 20% to 35% PbO, from 10% to 20% $B_2O_3$, from 20% to 30% of BaO, from 5% to 20% $SiO_2$, from 4% to 10% CaO, and 1% to 10% $Al_2O_3$, and a ceramic potting composition deposited thereabout, the final coated conductor comprising the metallic conductor coated with a layer of fused glass containing the said finely divided refractory material (II), the said polyester resin (I) having been driven off, and the coated conductor having thereover said potting composition in cured state.

References Cited in the file of this patent

UNITED STATES PATENTS

| | | |
|---|---|---|
| 2,072,557 | Hinsky | Mar. 2, 1937 |
| 2,829,191 | Rogers | Apr. 1, 1958 |
| 2,848,794 | Roth | Aug. 26, 1958 |
| 2,930,713 | Hoffman | Mar. 29, 1960 |

OTHER REFERENCES

Angewandte Chemie, Schnell, 68 Jahrg., 1956, No. 20, pages 633–640 relied on.